United States Patent
Koshikawa

[11] Patent Number: 6,134,079
[45] Date of Patent: Oct. 17, 2000

[54] MAGNETIC HEAD INCLUDING A POLE PIECE WITH SOFT MAGNETIC PARTICLES DISPERSED THEREIN AND MANUFACTURING METHOD THEREFOR

[75] Inventor: Takao Koshikawa, Kawasaki, Japan

[73] Assignee: Fujitsu Limited, Kawaski, Japan

[21] Appl. No.: 09/032,327

[22] Filed: Feb. 27, 1998

[30] Foreign Application Priority Data

Sep. 17, 1997 [JP] Japan ..................... 9-251963

[51] Int. Cl.$^7$ ................................................. G11B 5/133
[52] U.S. Cl. ................................... 360/126; 360/317
[58] Field of Search ..................... 360/113, 125, 360/126

[56] References Cited

U.S. PATENT DOCUMENTS 4,368,496  1/1983  Kato et al. ........................... 360/110

FOREIGN PATENT DOCUMENTS

| | | |
|---|---|---|
| 58-60425 | 4/1983 | Japan . |
| 60-50605 | 3/1985 | Japan . |
| 61-9824 | 1/1986 | Japan . |
| 2-201904 | 8/1990 | Japan . |
| 4-83313 | 3/1992 | Japan . |
| 4-226003 | 8/1992 | Japan . |
| 5-242427 | 9/1993 | Japan . |
| 5-258934 | 10/1993 | Japan . |
| 6-290414 | 10/1994 | Japan . |
| 8-306529 | 11/1996 | Japan . |

*Primary Examiner*—William R. Korzuch
*Attorney, Agent, or Firm*—Greer, Burns & Crain, Ltd.

[57] ABSTRACT

A magnetic head including a magnetic pole piece for forming a recording gap, and a coil interlinked with the magnetic pole piece. The magnetic pole piece is obtained by first preparing a plating solution containing a first component for precipitating a substantially uniform soft magnetic layer of NiFe, for example, next dispersing a second component for precipitating soft magnetic particles of FeN, for example, in the plating solution, and finally simultaneously precipitating the soft magnetic layer and the soft magnetic particles to obtain the magnetic pole piece. The simultaneous precipitation of the soft magnetic layer and the soft magnetic particles may be effected by a dispersion plating method. According to this method, the soft magnetic particles formed of a material having a greater resistivity or a material having a greater saturation magnetic flux density can be mixed in a base layer (the soft magnetic layer) formed of a soft magnetic material that can be electroplated. Accordingly, it is possible to provide a magnetic head which can obtain a high writing ability and can be formed in a high-precision shape (that is, can obtain a high recording density to a magnetic recording medium).

16 Claims, 5 Drawing Sheets

MAGNETIC HEAD INCLUDING A POLE PIECE WITH SOFT MAGNETIC PARTICLES DISPERSED THEREIN AND MANUFACTURING METHOD THEREFOR

BACKGROUND OF THE INVENTION

1. Field of the Invention

The present invention relates generally to an improvement in a magnetic recording device such as a magnetic disk drive and a magnetic tape drive, and more particularly to a magnetic head suitable for high-speed data transfer, a manufacturing method for the magnetic head, and a magnetic recording device having such a magnetic head.

In recent years, a data transfer rates have been increased with increases in recording density in magnetic recording devices. In response thereto, a magnetic head capable of recording data on a recording medium with a high-frequency signal is required.

2. Description of the Related Art

One type of conventionally known magnetic recording device includes a magnetic recording medium having a recording surface and a magnetic head to be accessed to an arbitrary position on the recording surface. A magnetic disk drive that includes a magnetic disk which is rotatably driven, and a magnetic head mounted on a head slider flying above the magnetic disk is one example of such a recording device. The head slider is driven in the radial direction of the magnetic disk by a head actuator that includes a voice coil motor, thereby accessing the magnetic head to an arbitrary position on the recording surface of the magnetic disk.

In this specification, the term of "magnetic recording" is used in the sense of magnetic writing and/or reading of electrical data.

One type of conventionally known magnetic head that is applicable to a magnetic recording device is an inductive magnetic head, which generally includes a magnetic pole piece for forming a recording gap (magnetic gap for writing/reading) and a coil interlinked with the magnetic pole piece. By passing a current modulated by data through the coil when writing data, a magnetic field that varies with the modulated current is formed in the recording gap. Accordingly, data is written on the recording surface of a recording medium by displacing the magnetic head relative to the recording medium in the condition where the magnetic head is opposed to the recording surface of the recording medium. On the other hand, when reading data recorded on a recording medium, the magnetic head is displaced relative to the recording medium to form a change in magnetic flux in a magnetic circuit including the magnetic pole piece and the recording surface of the recording medium, causing a change in voltage between the opposite ends of the coil, thereby reading data.

In recent years, a magnetoresistive effect element (MR element) whose resistance changes according to the magnitude of a magnetic field has been developed for reading only. A composite magnetic head including an MR element and an inductive magnetic head as a unit is usually called an MR head. In the MR head, the inductive magnetic head is used for writing only.

A conventional manufacturing method for the inductive magnetic head includes the step of obtaining a magnetic pole piece by precipitating a substantially uniform soft magnetic layer by electroplating. The soft magnetic layer is formed of a soft magnetic material such as permalloy. Permalloy is an alloy of 80 to 82% Ni (nickel) and the remaining percentage of Fe (iron).

With an increase in modulation frequency in writing data on a recording medium, the effect of eddy-current loss in the magnetic pole piece becomes large. That is, the head's writing ability to the recording medium decreases because of a reduction in the magnetic field strength while writing data in a high-frequency region.

In this respect, development is being pursued of a material having a high resistivity to accordingly achieve a reduced eddy-current loss, a material having a high saturation magnetic flux density to accordingly achieve a high magnetic field strength, or a material having a high resistivity and a high saturation magnetic flux density. However, in the case of using an electroplating method to provide the magnetic pole piece of the magnetic head, it is difficult to apply a material having a high resistivity or a material having a high saturation magnetic flux density.

It can be proposed to manufacture a magnetic pole piece of a material having a high resistivity or a material having a high saturation magnetic flux density by film deposition by sputtering and thereafter dry etching the deposited film. In this case, however, it is very difficult to accurately manufacture the front end of the magnetic pole piece to be of a narrow width. In other words, a high recording density to a magnetic recording medium cannot be obtained by the combination of sputtering and dry etching.

SUMMARY OF THE INVENTION

It is therefore an object of the present invention to provide a magnetic head and a manufacturing method therefor which can obtain a high writing ability in a high-frequency region and can obtain a high recording density to a magnetic recording medium.

It is another object of the present invention to provide a novel magnetic recording device having such a magnetic head.

Other objects of the present invention will become apparent from the following description.

In accordance with an aspect of the present invention, there is provided a manufacturing method for a magnetic head having a magnetic pole piece. First, a plating solution containing a first component for precipitating a substantially uniform soft magnetic layer is prepared. Secondly, a second component for precipitating soft magnetic particles (or grains) is dispersed in the plating solution. Finally, the soft magnetic layer and the soft magnetic particles are simultaneously precipitated to obtain the magnetic pole piece. The simultaneous precipitation of the soft magnetic layer and the soft magnetic particles may be effected by a dispersion plating method that can be carried out on the basis of a typical electroplating method.

According to this method, the soft magnetic particles formed of a material having a greater resistivity or a material having a greater saturation magnetic flux density can be mixed in a base layer (the soft magnetic layer) formed of a soft magnetic material that can be electroplated. Accordingly, it is possible to provide a magnetic head which can obtain a high writing ability in a high-frequency region and can be formed in a high-precision shape (that is, can obtain a high recording density to a magnetic recording medium).

In carrying out this method, a surface active agent acting on the second component for precipitating the soft magnetic particles is preferably added to the plating solution, thereby improving dispersion of the second component in the plating solution. Accordingly, dispersion of the soft magnetic particles in the soft magnetic layer of the magnetic pole piece obtained can be made uniform.

The whole or a part of the magnetic pole piece may be formed by the simultaneous precipitation of the soft magnetic layer and the soft magnetic particles.

In accordance with another aspect of the present invention, there is provided a magnetic head comprising a magnetic pole piece for forming a recording gap, and a coil interlinked with the magnetic pole piece. The magnetic pole piece includes a substantially uniform soft magnetic layer and soft magnetic particles dispersed in the soft magnetic layer.

With this configuration, the resistivity or the saturation magnetic flux density in the entire magnetic pole piece can be increased by suitably selecting the materials of the soft magnetic layer and the soft magnetic particles, thus achieving one of the objects of the present invention.

Either the entire magnetic pole piece, or only a part thereof, may be provided by the soft magnetic layer and the soft magnetic particles.

Preferably, the soft magnetic layer has a first resistivity, and the soft magnetic particles have a second resistivity that is greater than the first resistivity. More specifically, the second resistivity is preferably equal to or greater than 40 $\mu\Omega$cm. Considering that a resistivity obtained by conventional methods (electroplating only methods) is less than 40 $\mu\Omega$cm, it is apparent that a critical effect can be obtained by setting the second resistivity within a specific range as mentioned above.

Preferably, the soft magnetic layer has a first saturation magnetic flux density, and the soft magnetic particles have a second saturation magnetic flux density that is greater than the first saturation magnetic flux density. More specifically, the second saturation magnetic flux density is equal to or greater than 1.5 tesla. Considering that a saturation magnetic flux density obtained by conventional methods (electroplating only methods) is less than 1.5 tesla, it is apparent that a critical effect can be obtained by setting the second saturation magnetic flux density to be within a specific range as mentioned above.

According to a preferred embodiment of the present invention, the soft magnetic layer is formed of an alloy of at least two kinds of metals selected from Ni, Fe, and Co, and the soft magnetic particles are formed of a Fe-based material such as FeN and FeNZr, a Co-based material such as CoZr, CoZrNb, and CoZrCr, or a mixture of these materials.

According to a preferred embodiment of the present invention, the magnetic head further comprises a magnetoresistive effect element provided in the vicinity of the recording gap to read data. In this case, the magnetic pole piece can be subjected to writing only. Considering that a high resistivity and a high saturation magnetic flux density of the magnetic pole piece are required in writing data, the present invention is especially suitable for application to such a composite magnetic head.

In accordance with a further aspect of the present invention, there is provided a magnetic recording device comprising a magnetic recording medium having a recording surface, and a magnetic head accessed to an arbitrary position on the recording surface. The magnetic head has the configuration according to the present invention mentioned above.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
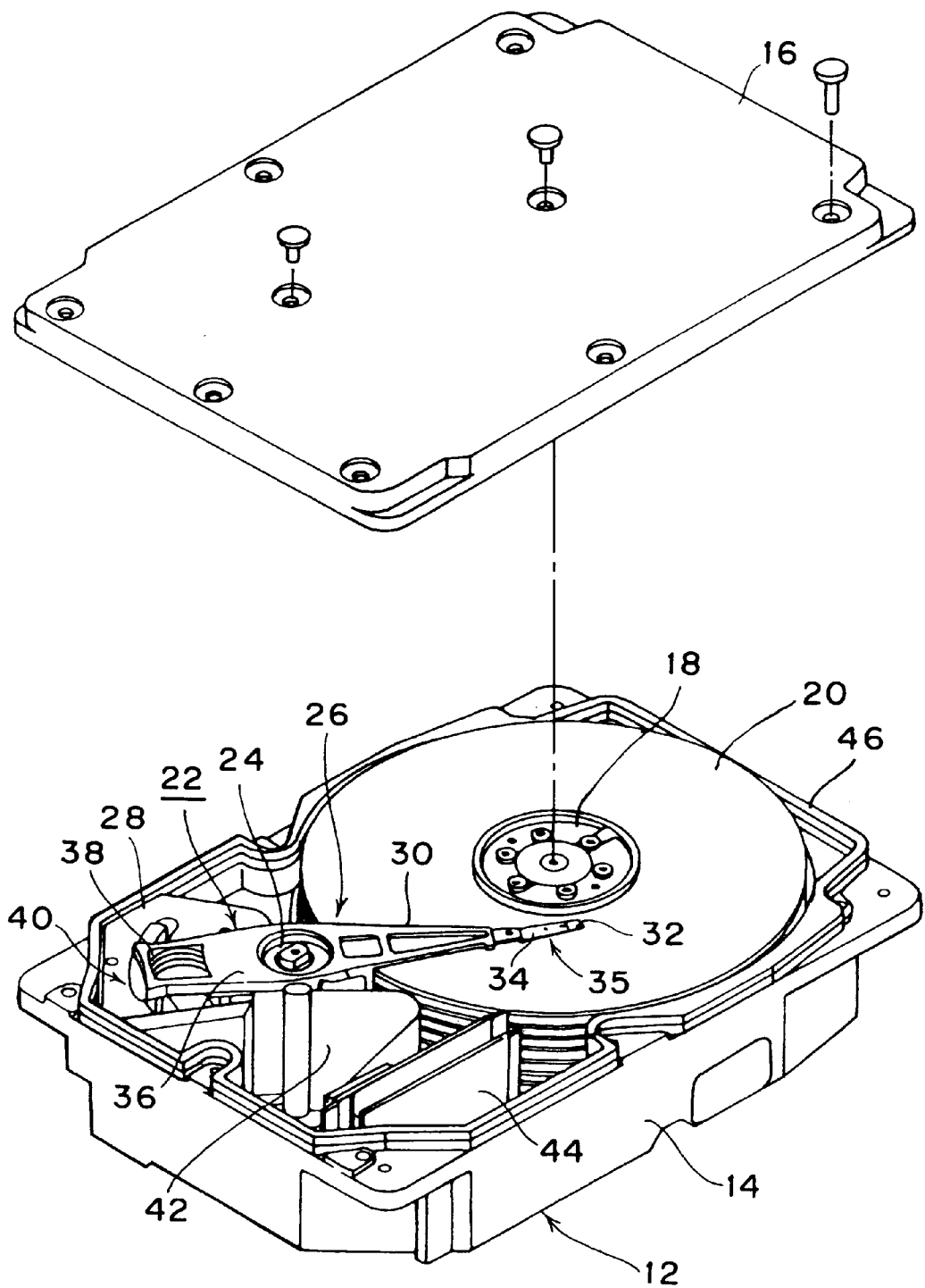
FIG. 1 is an exploded perspective view showing a preferred embodiment of the magnetic recording device (magnetic disk drive) according to the present invention.

Referring to FIG. 1, there is shown a preferred embodiment of a magnetic disk drive as the magnetic recording device according to the present invention. Reference numeral 12 denotes a housing (disk enclosure) consisting of a base 14 and a cover 16. A spindle hub (not shown) that is rotatably driven by an inner hub motor is provided on the base 14. A plurality of magnetic disks 20 and spacers (not shown) are mounted on the spindle hub in such a manner as to be alternately stacked. That is, the plural magnetic disks 20 are fixedly mounted on the spindle hub by securing a disk clamp 18 to the spindle hub by screws, and these disks are equally spaced a given distance by the spacers.

Reference numeral 22 denotes a rotary actuator consisting of an actuator arm assembly 26 and a magnetic circuit 28. The actuator arm assembly 26 is mounted so as to be rotatable about a shaft 24 fixed to the base 14. The actuator arm assembly 26 includes a plurality of actuator arms 30 extending from the center of rotation in one direction and a coil supporting member 36 extending from the center of rotation in a direction opposite to the direction of extension of the actuator arms 30. A head assembly 35 is fixed to a front end portion of each actuator arm 30. The head assembly 35 is composed of a head slider 32 having a magnetic head according to the present invention and a suspension 34 having a front end portion on which the head slider 32 is mounted. The suspension 34 is mounted at its rear end portion on the front end portion of the actuator arm 30.

A coil 38 is supported by the coil supporting member 36. The magnetic circuit 28 and the coil 38 which is inserted in a gap of the magnetic circuit 28, constitute a voice coil motor (VCM) 40. Reference numeral 42 denotes a flexible printed circuit board (FPC) for connecting the magnetic head of the head slider 32 to an external circuit. The flexible printed circuit board 42 is fixed at its one end by a fixing member 44, and is electrically connected to a connector (not shown). An annular packing assembly 46 is mounted on the base 14. The housing 12 is sealed by securing the cover 16 through the packing assembly 46 to the base 14 by screws.

Figure 2:
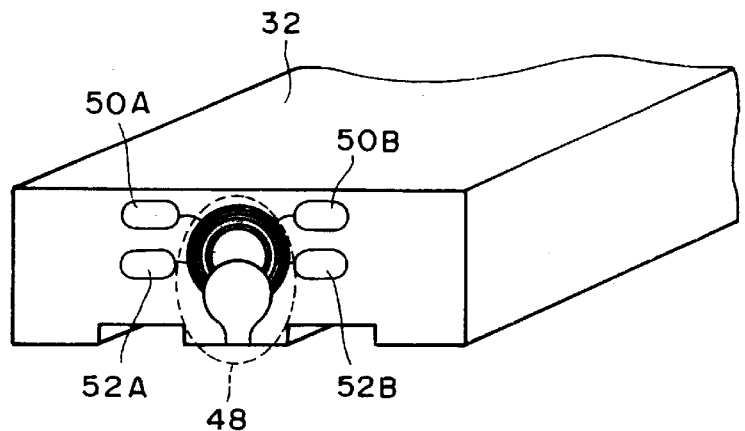
FIG. 2 is a cutaway perspective view of the head slider shown in FIG. 1.

FIG. 2 is a cutaway perspective view of the head slider 32 shown in FIG. 1. The head slider 32 is formed of ceramic. A magnetic head 48 according to the present invention is formed on the front end surface of the head slider 32 by a thin-film technique. The lower surface of the head slider 32 is formed with recesses and projections (air bearing) for flying the head slider 32 above the magnetic disk 20 opposed thereto. Reference numerals 50A and 50B denote a pair of terminals for writing data, and reference numerals 52A and 52B denote a pair of terminals for reading data. The terminals 50A, 50B, 52A, and 52B are connected through lead lines (not shown) to the flexible printed circuit board 42 (see FIG. 1).

Referring again to FIG. 1, each head slider 32 is opposed to the recording surface of the corresponding magnetic disk 20. When the magnetic disk 20 is rotated, an air flow is generated between the magnetic disk 20 and the head slider 32 opposed thereto to thereby fly the head slider 32 above the magnetic disk 20. The rotating direction of the magnetic disk 20 is usually set so that the magnetic head 48 (see FIG. 2) takes a downstream position of the air flow, thereby obtaining a stable distance (flying height) of about 0.02 to 0.1 µm between the front end of the magnetic head 48 and the magnetic disk 20. Further, by driving the voice coil motor 40 to move the head slider 32 in the radial direction of the magnetic disk 20, the magnetic head 48 can be accessed to an arbitrary position on the recording surface of the magnetic disk 20.

Figure 3:
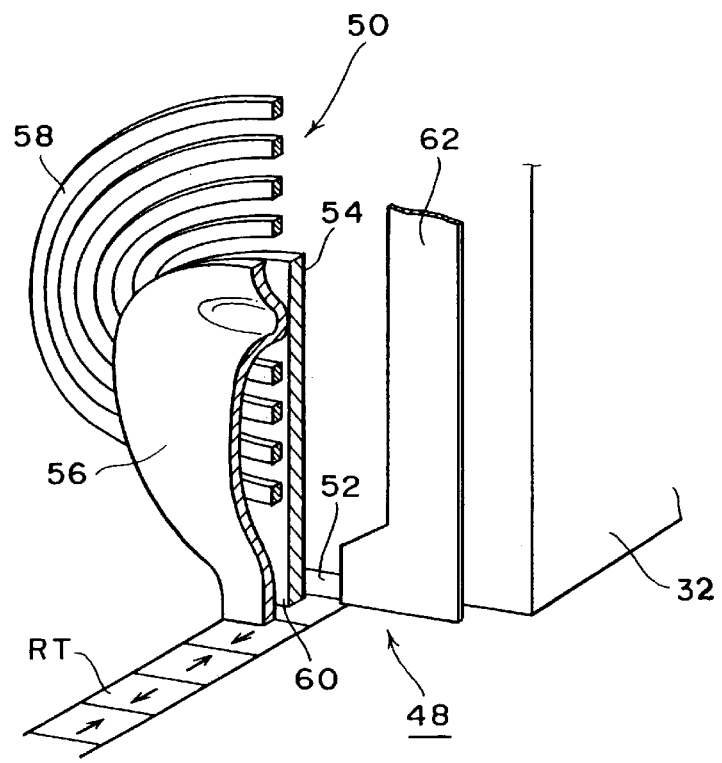
FIG. 3 is a cutaway perspective view of an important part of the magnetic head shown in FIG. 2.

FIG. 3 is a cutaway perspective view of an essential part of the magnetic head 48 shown in FIG. 2. The magnetic head 48 is provided as a composite head. That is, the magnetic head 48 includes an inductive head 50 for writing data and a magnetoresistive effect element (MR element) 52 for reading data.

The inductive head 50 has first and second magnetic pole pieces 54 and 56 for forming a recording gap 60 and a coil 58 interlinked with the magnetic pole pieces 54 and 56. By passing a current through the coil 58, a magnetic field is generated in the recording gap 60 to thereby form a recorded track RT on the recording surface of the magnetic disk 20. The recorded track RT consists of a plurality of magnetization segments arranged in the longitudinal direction (the circumferential direction of the magnetic disk 20), whereby binary signals of "0" and "1" are recorded according to the direction of magnetization in each segment (shown by arrows in FIG. 3).

The MR element 52 is provided in the vicinity of the recording gap 60. More specifically, the MR element 52 is located upstream of the recording gap 60 in respect of the moving direction of the recorded track RT. A pair of leads 62 (one of which being shown) formed of a conductive material are connected to the opposite ends of the MR element 52. The pair of leads 62 are connected to the terminals 52A and 52B shown in FIG. 2, and the opposite ends of the coil 58 are connected to the terminals 50A and 50B.

In the embodiment shown in FIG. 3, the inductive head 50 is used only to write data because the MR element 52 can be used to read data in the magnetic head 48. Alternatively, the inductive head 50 may be used both to write data and to read data without providing the MR element 52.

Figure 4:
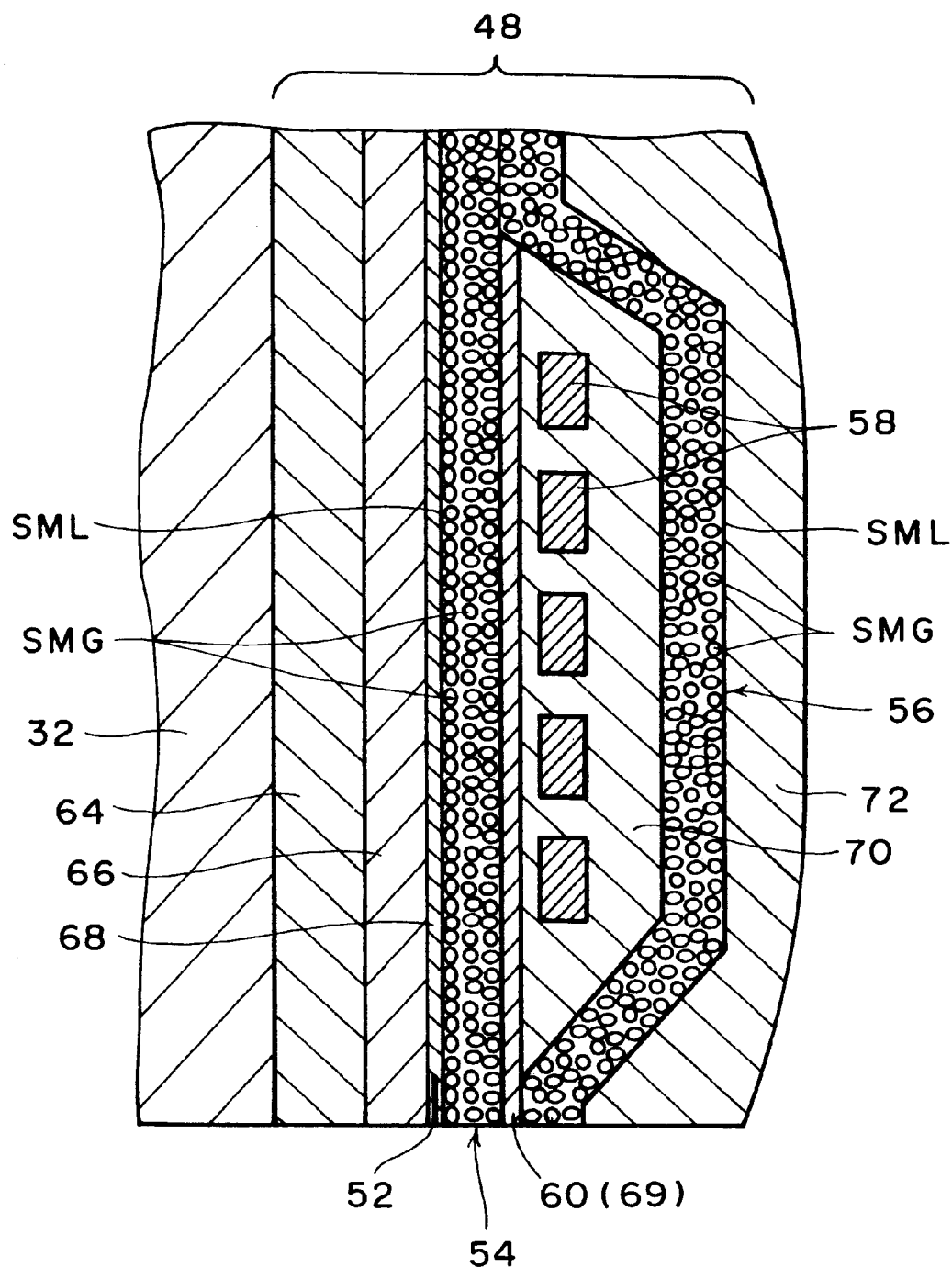
FIG. 4 is a sectional view of the magnetic head shown in FIG. 2.

FIG. 4 is a sectional view of the magnetic head 48 shown in FIG. 2. The head slider 32 may be obtained, for example, by forming a plurality of magnetic heads 48 on a wafer of a material such as $Al_2O_3 \cdot TiC$, and thereafter by cutting the wafer so as to individually separate the magnetic heads 48. Each magnetic head 48 has a multilayer structure obtained by thin-film deposition. This multilayer structure includes a first protective layer 64 of $Al_2O_3$ formed on the head slider 32, a shield layer 66 of permalloy formed on the protective layer 64, a second protective layer 68 of $Al_2O_3$ formed on the shield layer 66, an MR element 52 provided in the protective layer 68 so that an end portion of the MR element 52 is exposed to the lower end of the protective layer 68, a first magnetic pole piece 54 formed on the protective layer 62, a gap layer 69 of $Al_2O_3$ provided on the magnetic pole piece 54, an insulating layer 70 of photoresist formed on the gap layer 69, a coil 58 provided in the insulating layer 70, a second magnetic pole piece 56 formed on the insulating layer 70, and a third protective layer 72 of $Al_2O_3$ formed on the magnetic pole piece 56.

The magnetic pole pieces 54 and 56 are in close contact with each other at their upper portions, and the recording gap 60 is provided by the gap layer 69 between a lower portion of the magnetic pole piece 54 and a lower portion of the magnetic pole piece 56. The coil 58 is interlinked with the magnetic pole pieces 54 and 56.

In this preferred embodiment, the first magnetic pole piece 54 functions not only as a magnetic pole piece for forming a magnetic field in the recording gap 60 in writing data, but also as a shield for the MR element 52. That is, the MR element 52 is provided in the narrow spacing (the protective layer 68) between the magnetic pole piece 54 and the shield layer 66, whereby the MR element 52 is magnetically shielded by the magnetic pole piece 54 and the shield layer 66 to thereby improve resolution while reading data.

Each of the magnetic pole pieces 54 and 56 includes a substantially uniform soft magnetic layer SML of NiFe (e.g., permalloy) and soft magnetic particles (or grains) SMG of FeN dispersed in the soft magnetic layer SML. Each of the magnetic pole pieces 54 and 56 formed from such a mixture may be obtained by a dispersion plating method to be hereinafter described. Each of the magnetic pole pieces 54 and 56 has a thickness of between approximately 3 to 4 µm, so that the grain size of the soft magnetic particles SMG is set preferably to a submicron order.

Permalloy has a resistivity of about 20 $\mu\Omega$cm and a saturation magnetic flux density of 1 tesla, and FeN has a resistivity of about 70 $\mu\Omega$cm and a saturation magnetic flux density of 1.7 tesla. Therefore, as compared with the case in which each magnetic pole piece is formed of only NiFe by the prior art method, the resistivity and the saturation magnetic flux density can be increased according to this preferred embodiment, thereby avoiding lack of a recording magnetic field due to eddy-current losses in a high-frequency region.

The shield layer 66 of NiFe may be obtained by a usual simple plating method. Examples of a high current density bath and a low current density bath used in the simple plating method are shown in the Table below. In any of the baths, permalloy (20Fe:80Ni) can be obtained.

TABLE

|  | High Current Density Bath | Low Current Density Bath |
|---|---|---|
| Total $Ni^{2+}$ | 13.7 g/l | 12.4 g/l |
| Total $Fe^{2+}$ | 0.6 g/l | 0.24 g/l |
| Current Density | 36 mA/cm$^2$ | 4 mA/cm$^2$ |
| $NiCl_2 \cdot 6H_2O$ | 39 g/l | 35.3 g/l |
| ($Ni^{2+}$) | (9.7 g/l) | (8.7 g/l) |
| $NiSO_4 \cdot 6H_2O$ | 16.3 g/l | 14.7 g/l |
| ($Ni^{2+}$) | (4 g/l) | (3.7 g/l) |
| $FeSO_4 \cdot 7H_2O$ | 3 g/l | 1.2 g/l |
| ($Fe^{2+}$) | (0.6 g/l) | (0.24 g/l) |
| pH | 2.8 ± 0.05 | 3.0 ± 0.05 |
| $H_3BO_3$ | 25 g/l | 25 g/l |
| Sodium Saccharin | 1.5 g/l | 0.75 g/l |
| NaCl | — | 25 g/l |

TABLE-continued

|  | High Current Density Bath | Low Current Density Bath |
|---|---|---|
| Wetting Agent | 0.1 g/l | — |
| Temperature | 23° C. | 23° C. |
| Stirring Speed | 1 cps | 1 cps |

Additional details on the low current density bath are described in Japanese Patent Laid-open No. 55-82793.

The coil 58 can be obtained usually by a simple plating method for Cu.

The dispersion plating method for obtaining each of the magnetic pole pieces 54 and 56 will now be described. First, a plating solution for precipitating the soft magnetic layer SML as shown in the Table is prepared. In the next step, fine particles of FeN for precipitating the soft magnetic particles SMG are dispersed in the plating solution. To improve the dispersion, a surface active agent acting on the fine particles of FeN is preferably added to the plating solution.

Specifically, a cationic surface active agent such as perfluoroalkyltrimethyl ammonium salts in a concentration of about 10 g/L is added to the plating solution. A preferable amount of the surface active agent to 1 g of the fine particles of FeN is about 40 mg.

More specifically, a given amount of the fine particles of FeN and about 80% of an adequate amount of the surface active agent are put into a cup and are then stirred at 13,000 rpm by a homogenizer for about 10 minutes. In the next step, the plating solution is poured into the cup, and the remaining percentage, (that is, 20% of the surface active agent) is next added to the cup and stirred for 10 minutes. Thereafter, ultrasonic irradiation is carried out for 2 hours. In this manner, a dispersion plating bath in which the fine particles of FeN are well dispersed can be obtained. By using this dispersion plating bath, the soft magnetic layer SML and the soft magnetic particles SMG, are simultaneously precipitated thereby obtaining the magnetic pole pieces 54 and 56.

A manufacturing process for the magnetic pole pieces 54 and 56 by the dispersion plating method will now be described with reference to FIGS. 5A to 5D. FIGS. 5A to 5D show a forming process for the magnetic pole piece 54 on the second protective layer 68.

Figure 5A:
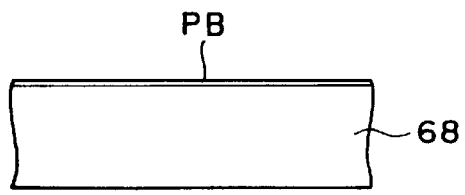
FIGS. 5A to 5D are views for illustrating a dispersion plating process.
Figure 5B:
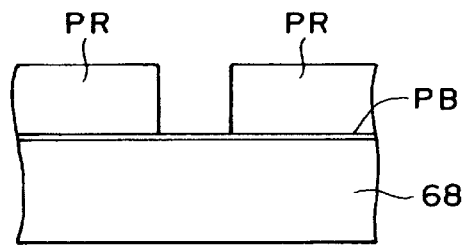
Figure 5C:
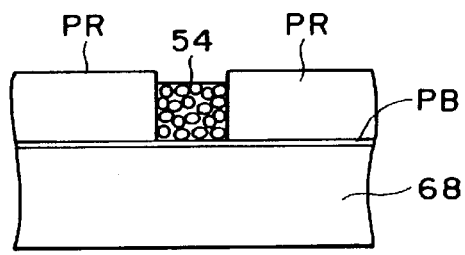
Figure 5D:
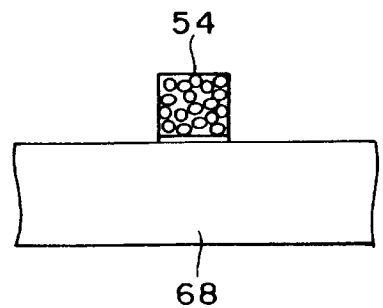

As shown in FIG. 5A, a plating base PB having a thickness of 0.05 μm, for example, is formed on the protective layer 68. Since the material of the protective layer 68 is $Al_2O_3$ that is an insulator, sputtering is suitable for the formation of the plating base PB on the insulator. As shown in FIG. 5B, a photoresist PR is formed on the plating base PB except for a portion on which the magnetic pole piece 54 is to be formed. As shown in FIG. 5C, the magnetic pole piece 54 is formed on the plating base PB by applying the above-mentioned dispersion plating method to simultaneously precipitate the soft magnetic layer SML and the soft magnetic particles SMG. As shown in FIG. 5D, the photoresist PR is removed, and an unrequired portion of the plating base PB is also removed by ion milling or the like to prevent short-circuits or the like.

As compared with the case where the magnetic pole piece is obtained by sputtering, patterning of the magnetic pole piece can be performed with high accuracy by the dispersion plating method, thereby obtaining a high recording density to a magnetic recording medium.

A forming process for the second magnetic pole piece 56 on the photoresist 70 shown in FIG. 4 is similar to the above forming process for the first magnetic pole piece 54, so the description thereof will be omitted herein.

Figure 6:
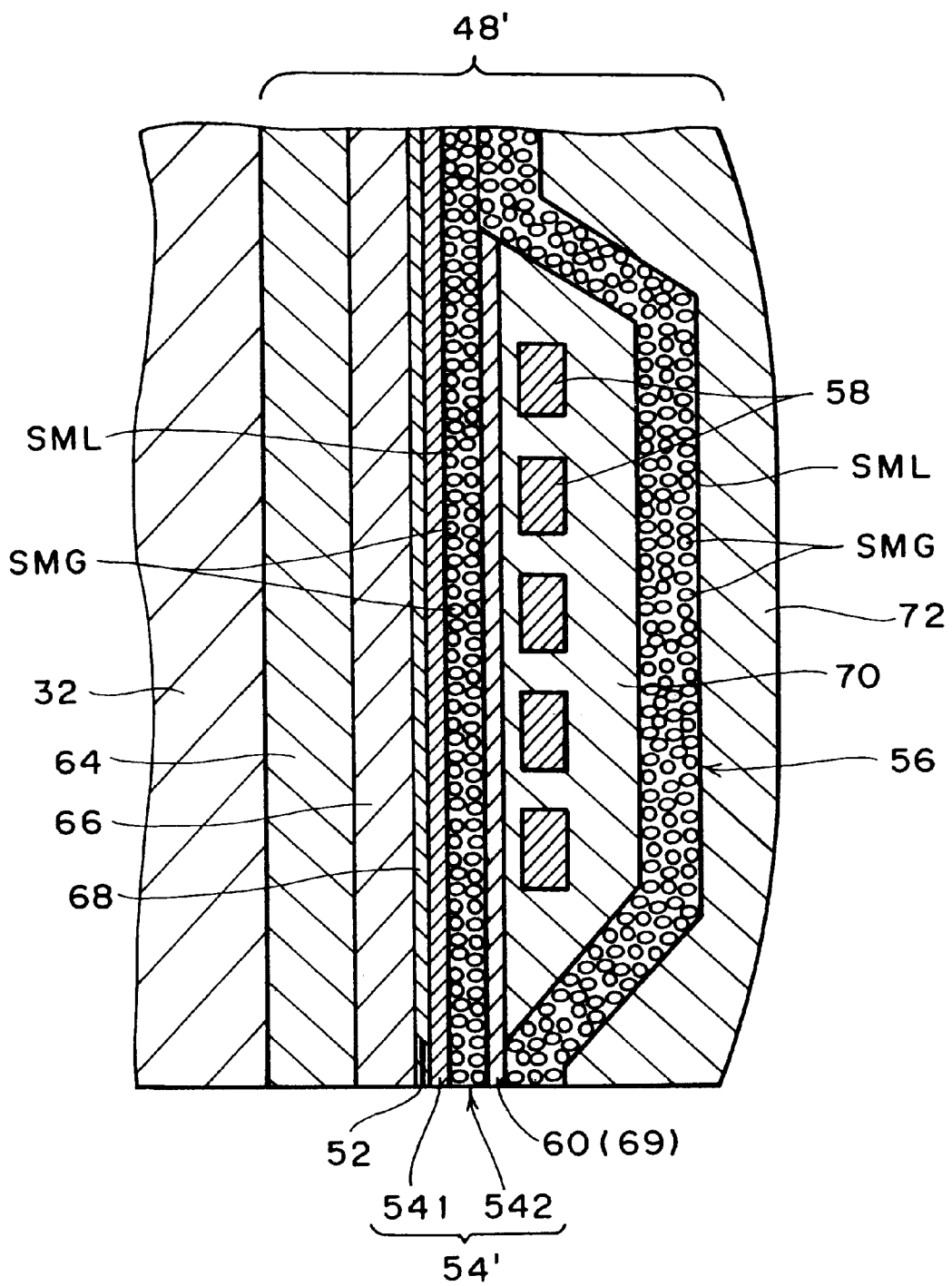
FIG. 6 is a sectional view showing another preferred embodiment of the magnetic head according to the present invention.

FIG. 6 is a sectional view showing another preferred embodiment of the magnetic head according to the present invention. In this preferred embodiment, a magnetic head 48' has a modified first magnetic pole piece 54'. The first magnetic pole piece 54' consists of a first layer 541 of NiFe formed on the protective layer 68 by a usual simple plating method and a second layer 542 formed on the first layer 541 by a dispersion plating method. Like the second magnetic pole piece 56, the second layer 542 includes a substantially uniform soft magnetic layer SML and soft magnetic particles SMG dispersed in the soft magnetic layer SML.

With this configuration, the first magnetic pole piece 54' has a composite structure consisting of the first layer 541 and the second layer 542. Therefore, it is possible to increase a degree of freedom of functional design of the first magnetic pole piece 54' required to function both as a magnetic pole piece for writing data and as a shield layer for the MR element 52 for reading data.

Thus, the present invention is not limited to the application of a dispersion plating method to the whole of the magnetic pole piece for forming a recording gap, but the advantages of the present invention can be obtained also by applying a dispersion plating method to a part of the magnetic pole piece.

The fine particles of FeN used in the dispersion plating method may be obtained by sputtering, for example. By increasing the gas pressure during sputtering fine particles each having a diameter of less than 0.1 μm can be obtained.

As described above, according to the present invention, it is possible to provide a magnetic head and a manufacturing method therefor which can obtain a high writing ability in a high-frequency region and a high recording density to a magnetic recording medium. Further, it is possible to provide a magnetic recording device which can obtain a high storage capacity and a high data transfer rate by using the above magnetic head.

The present invention is not limited to the details of the above described preferred embodiments. The scope of the invention is defined by the appended claims and all changes and modifications that fall within the equivalence of the scope of the claims are therefore to be embraced by the invention.

What is claimed is:

1. A magnetic head comprising:
   a magnetic pole piece for forming a recording gap; and
   a coil interlinked with said magnetic pole piece;
   said magnetic pole piece including a substantially uniform soft magnetic layer and soft magnetic particles dispersed in said soft magnetic layer, wherein said soft magnetic particles are formed of a material selected from the group consisting of FeN FeNZr, CoZr, CoZrNb, and CoZrCr.

2. A magnetic head according to claim 1, wherein:
   said soft magnetic layer has a first resistivity; and
   said soft magnetic particles have a second resistivity greater than said first resistivity.

3. A magnetic head according to claim 2, wherein said second resistivity is equal to or greater than 40 μΩcm.

4. A magnetic head according to claim 1, wherein:
   said soft magnetic layer has a first saturation magnetic flux density; and
   said soft magnetic particles have a second saturation magnetic flux density greater than said first saturation magnetic flux density.

5. A magnetic head according to claim 4, wherein said second saturation magnetic flux density is equal to or greater than 1.5 tesla.

6. A magnetic head according to claim 1, wherein said soft magnetic layer is a plated film.

7. A magnetic head according to claim 1, wherein said soft magnetic layer is formed of an alloy containing at least two kinds of metals selected from the group consisting of Ni, Fe, and Co.

8. A magnetic head according to claim 1, further comprising a magnetoresistive effect element provided in the vicinity of said recording gap to read data.

9. A magnetic recording device comprising:
a magnetic recording medium having a recording surface; and
a magnetic head accessed to an arbitrary position on said recording surface;
said magnetic head including:
a magnetic pole piece for forming a recording gap; and
a coil interlinked with said magnetic pole piece;
said magnetic pole piece including a substantially uniform soft magnetic layer and soft magnetic particles dispersed in said soft magnetic layer, wherein said soft magnetic particles are formed of a material selected from the group consisting of FeN, FeNZr, CoZr, CoZrNb, and CoZrCr.

10. A magnetic recording device according to claim 9, wherein:

said soft magnetic layer has a first resistivity; and
said soft magnetic particles have a second resistivity greater than said first resistivity.

11. A magnetic recording device according to claim 10, wherein said second resistivity is equal to or greater than 40 $\mu\Omega cm$.

12. A magnetic recording device according to claim 9, wherein:
said soft magnetic layer has a first saturation magnetic flux density; and
said soft magnetic particles have a second saturation magnetic flux density greater than said first saturation magnetic flux density.

13. A magnetic recording device according to claim 12, wherein said second saturation magnetic flux density is equal to or greater than 1.5 tesla.

14. A magnetic recording device according to claim 9, wherein said soft magnetic layer is a plated film.

15. A magnetic recording device according to claim 9, wherein said soft magnetic layer is formed of an alloy containing at least two kinds of metals selected from the group consisting of Ni, Fe, and Co.

16. A magnetic recording device according to claim 9, further comprising a magnetoresistive effect element provided in the vicinity of said recording gap to read data.

* * * * *